United States Patent

[11] 3,568,094

[72] Inventor Lenard M. Metzger
Rochester, N.Y.
[21] Appl. No. 754,933
[22] Filed Aug. 23, 1968
[45] Patented Mar. 2, 1971
[73] Assignee Eastman Kodak Company
Rochester, N.Y.

[54] PULSE WIDTH MODULATOR
7 Claims, 4 Drawing Figs.

[52] U.S. Cl. .......... 332/9, 325/152, 328/134, 331/47, 332/3, 332/14
[51] Int. Cl. .......... H03k 7/08
[50] Field of Search .......... 332/3, 19, 43, 43 (B), 44, 9, 14, 91; 325/152, 144, 142; 328/63, 134, 207; 307/269, 273; 331/47

[56] References Cited

UNITED STATES PATENTS

| | | | |
|---|---|---|---|
| 2,470,028 | 5/1949 | Gordon | 328/207(UX) |
| 2,967,279 | 1/1961 | Beck | 332/3 |
| 3,161,829 | 12/1964 | Schulman | 325/152 |
| 3,258,698 | 6/1966 | Asher | 328/63X |
| 3,454,788 | 7/1969 | Tyler et al. | 307/273X |

*Primary Examiner*—Alfred L. Brody
*Attorneys*—R. W. Hampton and Daniel E. Sragow

ABSTRACT: A pulse width modulation sound reproduction system includes a monostable multivibrator which is switched at the beginning of each cycle of a super-audio input provided by an astable or free-running multivibrator. An audio frequency input determines the time during which the monostable multivibrator remains in its unstable state; the output of the monostable multivibrator is fed to a loudspeaker. In one embodiment, logic circuitry connected between the outputs of the astable and monostable multivibrators disconnects the load when the input is below a predetermined level so as to increase the efficiency of the system.

LENARD M. METZGER
*INVENTOR*

BY

ATTORNEYS

LENARD M. METZGER
INVENTOR

Daniel E. Sragow

BY Robert W Hampton
ATTORNEYS

PULSE WIDTH MODULATOR

BACKGROUND OF THE INVENTION

1. Field of the Invention

The present invention relates to sound reproduction systems and more particularly to sound reproduction systems utilizing pulse width modulation techniques.

2. The Prior Art

Sound reproduction systems wherein an audio input is utilized to provide pulse width modulation of a high-frequency carrier are know. A characteristic arrangement of this type may include a high-frequency source such as a square wave generator and an audio input connected to a pulse width modulator. The high-frequency carrier signal is modulated by the audio input so as to produce a train of pulses whose widths vary in accordance with the amplitude of the audio input to the modulator. The output of the modulator is then fed through a low-pass filter to a loudspeaker. The low-pass filter minimizes the high-frequency components of the pulse train so that a signal corresponding to the audio input is produced. In some arrangements the loudspeaker itself is utilized as the low-pass filter.

SUMMARY OF THE PRESENT INVENTION

In accordance with the present invention a sound reproduction system is provided wherein the carrier frequency is automatically turned off when the level of modulation provided by an audio input drops below a predetermined value, in order to increase the efficiency of the system.

In accordance with a preferred embodiment of the invention a monostable multivibrator triggered by a high-frequency source in the form of an astable or free-running multivibrator produces a symmetrical output signal in the absence of a modulating signal. In accordance with an important feature of the invention logic circuitry disconnects the monostable multivibrator when the modulating signal is below a certain level. In a specific embodiment of the invention the output of an astable multivibrator is compared with the output of the monostable multivibrator in an AND circuit arrangement which permits the monostable multivibrator to produce an output only when the modulation signal is above a certain level.

A further feature of the present invention is that the frequency of the output of the monostable multivibrator does not vary with the modulation level. Such an arrangement is advantageous as compared with a system wherein one-half cycle of the period of an astable multivibrator varies in accordance with the audio input thereto because the period of the output of such systems is not constant but rather is a function of the audio input. Systems of this latter type are prone to a shifting of the carrier frequency either higher or lower for extreme excursions of the audio input. A higher frequency is more difficult for the loudspeaker to handle, whereas a lower frequency may get into the audio range.

BRIEF DESCRIPTION OF THE DRAWINGS

Other features and advantages of the invention will be apparent from the description of the preferred embodiments found hereinbelow when read in light of the drawing wherein.

DESCRIPTION OF THE PREFERRED EMBODIMENTS

Figure 1:
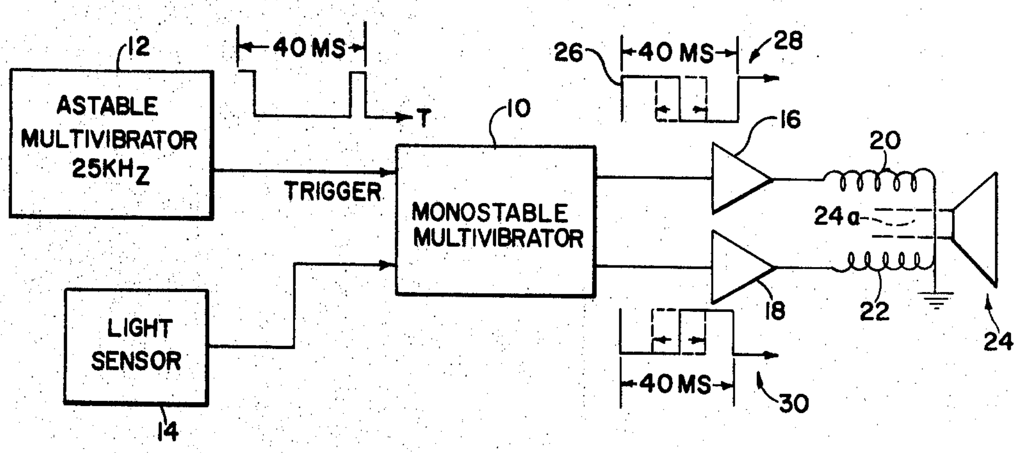
FIG. 1 is a block diagram, including representations of wave forms found at various points therein, of a sound reproduction system according to the invention.

Referring to FIG. 1, there is shown a sound reproduction system according to the invention. A monostable multivibrator 10 is triggered by an astable multivibrator 12 which oscillates at approximately 25kHz., which is just above the audible range. A 25kHz. carrier frequency can be utilized to produce up to about a 12kHz. audio frequency. A sensor 14 shown for purposes of illustration to be a light sensor such as a light sensitive transistor, controls the time during which the monostable multivibrator 10 is in its unstable state. Alternate half cycles of the output of monostable multivibrator 10 are applied through amplifiers 16 and 18 to the first and second armature coils 20 and 22 of a dual-coil loudspeaker, generally denoted 24. Loudspeaker 24 is of conventional construction. Coils 20 and 22 are mounted upon speaker cone **24*a* indicated in dashed lines in FIG. 1. Monostable multivibrator 10 and astable multivibrator 12** may take any suitable form and thus a detailed description of the component elements thereof is deemed unnecessary.

In operation, monostable multivibrator 10 is triggered into its unstable state during each cycle of the 25kHz. clock frequency provided by astable multivibrator 12. As stated supra, the length of time that monostable multivibrator 10 remains in its unstable state is dependent upon the level of illumination sensed by light sensor 14. Monostable multivibrator 10 is adjusted so that when there is no signal input from sensor 14, the output of the multivibrator 10 will be a symmetrical rectangular wave as indicated in solid lines at 26. Amplifiers 16 and 18 operate in a switching mode, each alternately delivering full current or no current. Thus when a full current output pulse is delivered by amplifier 16 to coil 20 the output of amplifier 18 delivered to coil 22 is zero and vice versa. The output waveforms of amplifiers 16 and 18 are generally denoted 28 and 30 in FIG. 1. The alternate pulses of pulse trains 28 and 30 when applied to coils 20 and 22 will cause equal back and forth movements of the speaker cone **24*a*** at the 25kHz. carrier frequency rate. Under these circumstances there will be no net displacement of the speaker cone, since the inertia of the speaker cone prevents substantial movement at this frequency.

The operation of FIG. 1 has been for conditions when the signal level from sensor 14 is at or near zero. This level may correspond to an average level of illumination passing through an optical sound track and sensed by a light sensitive transistor. As the light level, or other signal sensed by the sensor, varies above and below the above described zero level, the time during which monostable multivibrator 10 will be in its unstable state will vary correspondingly. This variation will result in a consequent variation in the width of the pulses of pulse trains 28 and 30 as is indicated in dashed lines in FIG. 1. Under these circumstances the length of time during which speaker coils 20 and 22 are energized will vary and thus there will be a net displacement of speaker cone **24*a*, in a direction dictated by the coil energized for the greater period of time, at the rate of the input signal from sensor 14**.

As set forth above, the output frequency of monostable multivibrator 10 remains constant regardless of the audio input to multivibrator 10. This feature of the circuit shown in FIG. 1 is an advantage as compared with systems wherein the pulse width of one-half cycle of the output of a multivibrator is kept fixed while the pulse-width of the second half-cycle of the multivibrator is modulated in accordance with the audio input so that the total period of the input to the speaker is the sum of the fixed pulse width and the modulated pulse width. By maintaining the period of the superaudio carrier frequency constant, extreme excursions in audio modulation will not shift the carrier frequency into the audio range. Further, the carrier frequency will not be shifted into higher frequency ranges. This is an advantage since at higher frequencies the response of the speaker falls off markedly.

Figure 2:
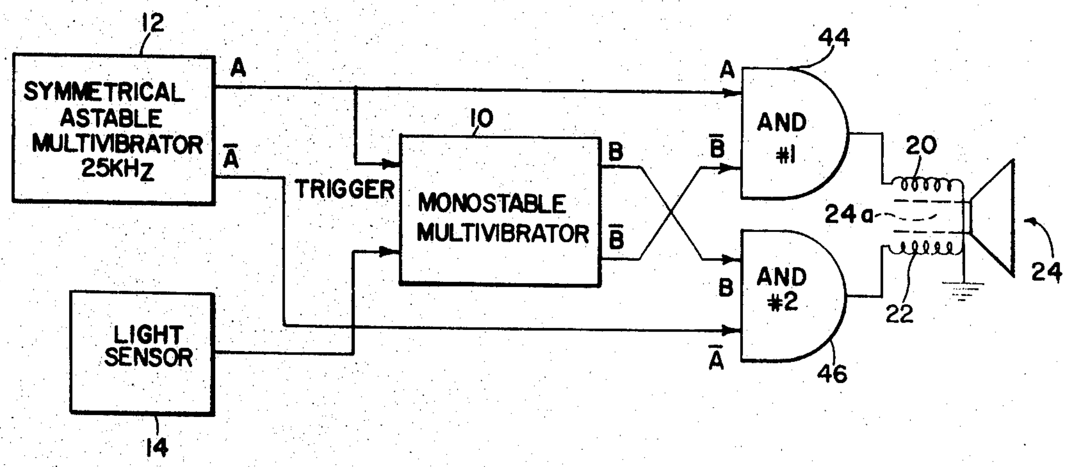
FIG. 2 is a block diagram of an embodiment of the present invention using logic switching.

Referring to FIG. 2, an embodiment of the present invention is shown which provides increased efficiency. When the audio input signal level falls at or near zero the carrier is automatically eliminated. The circuit of FIG. 1 may be conveniently thought of as operating "class A" whereas the circuit of FIG. 2, as will be better understood from the description hereinbelow, may be thought of as operating "class B."

The circuit of FIG. 2 is similar to that of FIG. 1 and includes a monostable multivibrator 10 triggered by a symmetrical astable multivibrator 12 as described in connection with FIG. 1. A light sensor 14 provides a signal input to monostable multivibrator 10. The system further includes a dual-coil speaker arrangement 24 which includes speaker coils 20 and 22 which control movement of a speaker cone 24*q*.

In accordance with a feature of the present invention, logic circuitry comprising first and second AND-gates 44 and 46 provide elimination of the 25 kHz. carrier frequency under certain circumstances. Astable multivibrator 12 and monostable multivibrator 10 each produce first and second outputs which are 180° out of phase. Astable multivibrator 12 provides a first symmetrical rectangular wave output denoted A in FIGS. 3*a* and 4*a*, and a second symmetrical rectangular wave output denoted $\overline{A}$ shown in FIGS. 3*b* and 4*b* which are 180° out of phase. Outputs A and $\overline{A}$ are related as illustrated in FIGS. 3*a* and 3*b* and in FIGS. 4*a* and 4*b*, the output A being non-zero when the output $\overline{A}$ is zero and output A being zero when the output $\overline{A}$ is non-zero.

Monostable multivibrator 10 similarly provides first and second outputs B and $\overline{B}$ related as shown in FIGS. 3*c*, 3*d*, 4*c*and 4*d*. As above, output B is non-zero when output $\overline{B}$ is zero and vice versa as shown.

Figure 3:
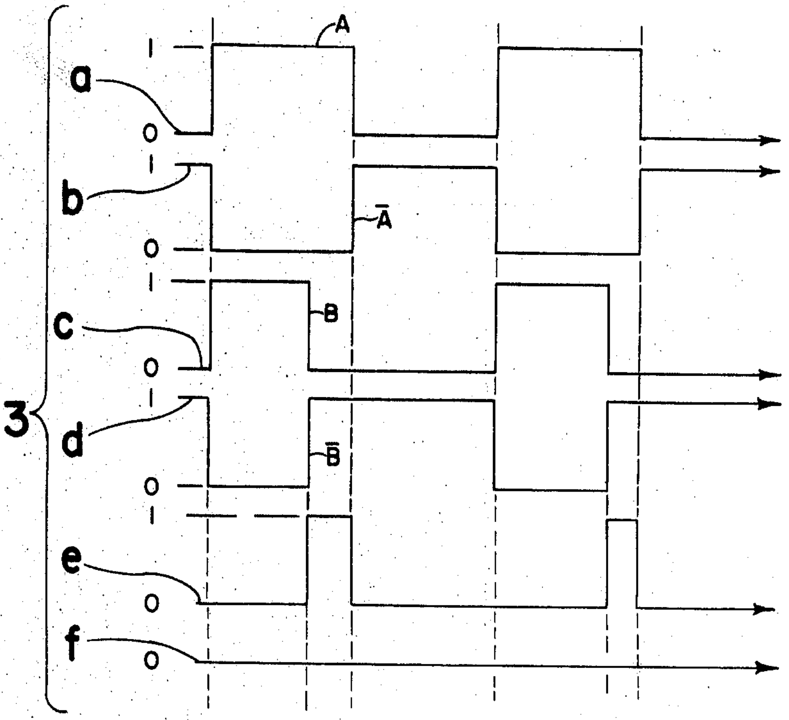
FIGS. 3 and 4 are representations of wave forms associated with the circuit of FIG. 2.
Figure 4:
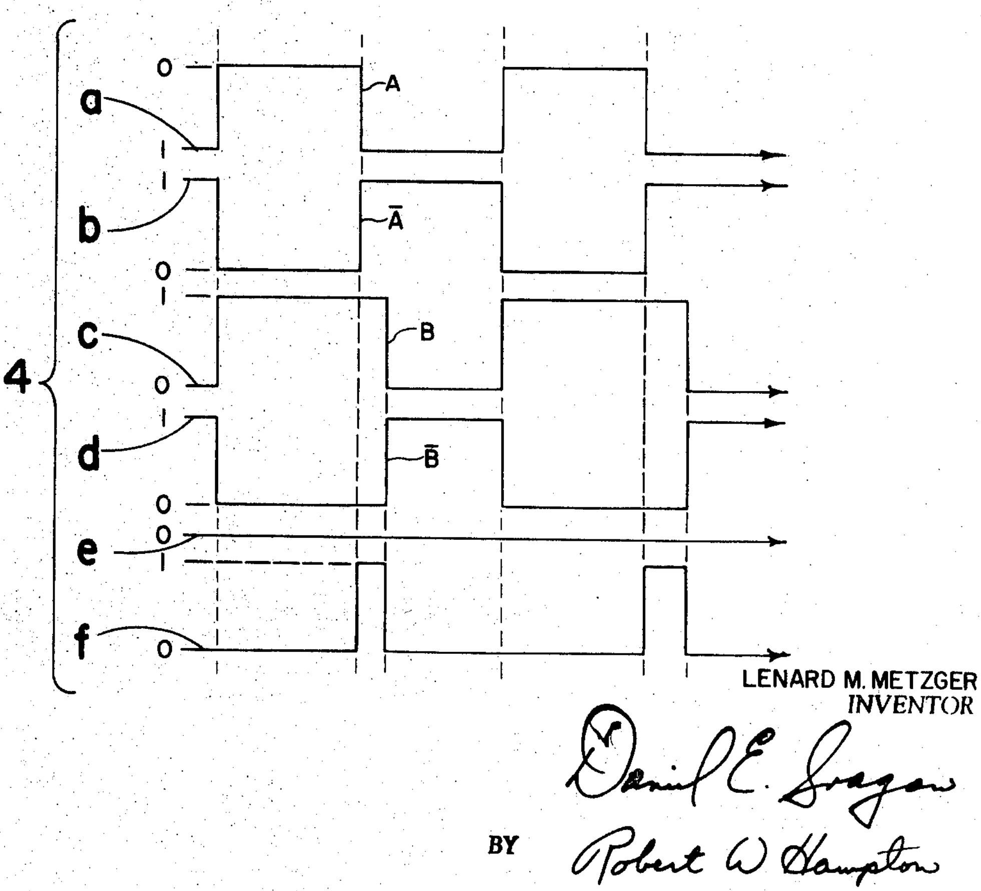

In the absence of a modulating input from light sensor 14 the outputs of monostable multivibrator 10 will be symmetrical rectangular waves similar to those shown in FIGS. 3*a* and 3 and 3*b* and in FIGS. 4*a* and 4*b* for multivibrator 12. When the instantaneous signal level falls below the average or zero audio input level the duty cycle of outputs B and $\overline{B}$ of monostable multivibrator 10 varies from the 50 percent value for a symmetrical rectangular wave as is shown in FIGS. 3*c* and 3*d* . Similarly, for instantaneous signal levels above the preselected level, the outputs B and $\overline{B}$ of monostable multivibrator 10 will have waveforms similar to those shown in FIGS. 4*c* and 4*d*.

As shown in FIG 2 AND-gate 44 includes a first input connected to output A of astable multivibrator 12 and a second input connected to output $\overline{B}$ of monostable multivibrator 10. AND-gate 46 has a first input connected to output B of monostable multivibrator 10 and a second input connected to output $\overline{A}$ of astable multivibrator 12.

In operation, when the instantaneous input signal level is below zero, monostable multivibrator 10 will shorten its pulse width as shown in FIGS. 3*c* and 3*d*. AND-gate 44, which compares outputs A and $\overline{B}$, will produce a train of pulses corresponding to the coincidence of outputs A and $\overline{B}$ as shown in FIG. 3*e*. Because there is no coincidence between pulse trains B and $\overline{A}$, AND-gate 46, which compares these outputs produces no output, as is indicated in FIG. 3*f*. A similar but "r-everse" situation occurs when the signal level is instantaneously above zero. Here the pulse width of the output of multivibrator 10 is increased as shown in FIGS. 4*c* and 4*d*. Comparison of output A and output $\overline{B}$ and AND-gate 44 produces a zero output whereas comparison of outputs B and $\overline{A}$ by AND-gate 46 produces a series of pulses as shown in FIG. 4*f*. It will of course be appreciated that the varying widths of the individual pulses shown in FIGS. 3*e* and 4*f* are related to the audio input to monostable multivibrator 10. It will be further appreciated that where the level of modulation is such that outputs B and $\overline{B}$ are symmetrical rectangular waves the outputs of AND-gates 44 and 46 will both be zero; thus there will be no input to the speaker coils 20 and 22 of speaker 24. Hence, as stated, there will be complete elimination of the carrier when there is no input modulation signal. Such operation greatly improves the efficiency of the system as compared with the operation of a "class A" system such as shown in FIG. 1.

Although the present invention has been described with a light sensor as the modulating input to the monostable multivibrator it is within the scope of the invention to use an audio input signal from any source. For example a strain gauge type of sensor could be coupled to a phonograph needle to provide an audio input to the multivibrator in a phonograph sound system. Further, a magnetoresistive or electromagnetic pickup could be used to provide an audio input so that the present invention could be incorporated in a magnetic tape playback system. These uses are, of course, merely exemplary and are not exhaustive of the types of suitable audio inputs.

Additionally, it will be appreciated that although a dual-coil speaker system has been illustrated the invention may be utilized with any suitable conventional loudspeaker, provided that suitable corresponding changes are made to the circuitry.

It is of course apparent that currents having frequencies other than the ones mentioned could be used. The invention is not to be limited to a 25kHz. carrier frequency.

It will further be understood by those skilled in the art that although the invention has been described in considerable detail with reference to certain preferred embodiments thereof, variations and modifications can be effected without departing from the scope and spirit of the invention as described hereinabove and as defined in subjoined claims.

I claim:

1. Pulse width modulation apparatus for providing an output signal whose duration depends upon the deviation of an input signal from a predetermined value, said modulation apparatus comprising:

means means for producing a pair of output pulse signals and for cyclically varying each signal between first and second voltage values, one of said output signals normally having the first value when the other output signal has the second value and vice versa;

means responsive to the input signal for varying the time period that one of said output signals is at its first and second values;

an output terminal for applying said output signals to a load; and a logic circuit connected between said output terminal and said output signal-producing means, said logic circuit including means for coupling said output terminal to said output signal-producing means only when each of said output signals is at its first voltage value.

2. Pulse width modulation apparatus as defined in claim 1 wherein said logic circuit comprises and AND-gate having:

a first input for receiving one of said output signals;

a second input for receiving the other of said output signals; and an output coupled to said output terminal.

3. Pulse width modulation apparatus as defined in claim 1 wherein said means for producing said output signals and for varying the duration of said one output signal comprises:

a monostable multivibrator for producing said one output signal;

an astable multivibrator for producing the other of said output signals; and means for modulating said monostable multivibrator for changing the time period that said one output signal signal is at its first and second values.

4. Pulse width modulation apparatus as defined in any one of claims 1—3 wherein the frequency of said output signals are approximately double the highest frequency of said input signal.

5, Pulse width modulation apparatus as defined in any one of claims 1—4 wherein the frequency of said output signals is approximately 25kHz.

6. Pulse width modulation apparatus for providing a pair of output signals whose respective durations are dependent upon the direction and amount of deviation of an input signal from a predetermined value, said modulation apparatus comprising:

carrier-generating means for generating first and second output pulse signals and for cyclically varying each signal between first and second voltage values;

carrier-modulating means for producing third and fourth output pulse signals and for cyclically varying each signal between first and second voltage values, said first output pulse signal normally having the first voltage value when said third output pulse signal has the second voltage value and vice versa second output pulse signal normally having the first voltage value when said fourth output signal has the second voltage value and vice versa;

means responsive to the direction and amount of deviation of the input signal from the predetermined value for varying the time period that said third and fourth output signals are at their first and second values;

output terminals for applying said output signals to a load; and a logic circuit connected between said output terminals and said carrier-generating and modulating means, said logic circuit including means for coupling said output terminals to said carrier-generating and modulating means only if each of said first and third output signals is at its first value or if each of said second and fourth output signals is at its first value.

7. Pulse width modulation apparatus as defined in claim 6 wherein said logic circuit comprises:

a first AND-gate having first and second inputs for receiving said first and third output signals, respectively, said first AND-gate further having an output coupled to one of said output terminals; and a second AND-gate having first and second inputs for receiving said second and fourth output signals, respectively, said second AND-gate further having an output coupled to the other of said output terminals.